United States Patent [19]

Shalit

[11] Patent Number: 5,345,315

[45] Date of Patent: * Sep. 6, 1994

[54] METHOD AND SYSTEM FOR IMPROVED TONE AND COLOR REPRODUCTION OF ELECTRONIC IMAGE ON HARD COPY USING A CLOSED LOOP CONTROL

[75] Inventor: Hanoch Shalit, Roslyn Heights, N.Y.

[73] Assignee: Imatec, Ltd., Roslyn, N.Y.

[ * ] Notice: The portion of the term of this patent subsequent to Jul. 3, 2007 has been disclaimed.

[21] Appl. No.: 855,619

[22] Filed: Mar. 20, 1992

Related U.S. Application Data

[63] Continuation-in-part of Ser. No. 544,232, Jun. 26, 1990, Pat. No. 5,115,229, which is a continuation-in-part of Ser. No. 275,218, Nov. 23, 1988, Pat. No. 4,939,581.

[51] Int. Cl.$^5$ .................. H04N 1/23; H04N 1/40; H04N 1/46
[52] U.S. Cl. ..................... 358/406; 358/455; 358/504; 358/521; 358/527; 358/300
[58] Field of Search .............. 358/455, 458, 456, 406, 358/75, 80, 139, 244, 298, 300, 76, 504, 521, 518, 534, 527, 189, 191, 184, 350

[56] References Cited

U.S. PATENT DOCUMENTS

| | | | |
|---|---|---|---|
| 4,568,975 | 2/1986 | Harshbarger | 358/139 |
| 4,766,503 | 10/1988 | Lambert . | |
| 4,779,106 | 10/1988 | Mills | 358/300 |
| 4,794,460 | 12/1988 | Shiota | 358/244 |
| 4,875,032 | 10/1989 | McManus et al. | 358/80 |
| 4,929,978 | 5/1990 | Kanamori et al. | 358/80 |
| 4,939,581 | 7/1990 | Shalit | 358/244 |

FOREIGN PATENT DOCUMENTS 0230361 7/1987 European Pat. Off. .
58-1150 6/1983 Japan .

*Primary Examiner*—Scott A. Rogers
*Attorney, Agent, or Firm*—Eliot S. Gerber

[57] ABSTRACT

A hard copy reproduction is formed of a video image which is an accurate reproduction of the tonal luminance differences and color of the video image. A gray scale and color test image is formed on the video monitor screen and measured using a photometer. The gray scale and color test image is reproduced on hard copy and may be measured using a densitometer. The two sets of measurements are entered into a computer system and used to adjust, on a pixel-by-pixel basis, the electronic controls of the hard color reproduction system to compensate for any deviations from accurate reproduction.

24 Claims, 6 Drawing Sheets

METHOD AND SYSTEM FOR IMPROVED TONE AND COLOR REPRODUCTION OF ELECTRONIC IMAGE ON HARD COPY USING A CLOSED LOOP CONTROL

RELATED APPLICATION

This application is a continuation-in-part application based in part on Application Ser. No. 07/544,232, filed Jun. 26, 1990, now U.S. Pat. No. 5,115,229, which is a continuation-in-part application based in part on application Ser. No. 07/275,218, filed Nov. 23, 1988, now U.S. Pat. No. 4,939,581.

BACKGROUND OF THE INVENTION

1. Field of the Invention

The present invention relates to the compensation of a video image to provide an accurate hard copy reproduction of the tonal luminance differences of the image.

2. Description of the Prior Art

At the present time, in a number of fields, a hard copy reproduction is made from a video image, or the video image is part of the image reproduction chain, and it is desired that the hard copy be an accurate reproduction of the tonal luminance differences of the image. For example, in the medical field a CAT X-ray scan, an ultrasonic scan, an NMR scan (nuclear magnetic resonance) or thermograph image is produced on a video monitor CRT (cathode ray tube) screen for immediate viewing by the physician. Simultaneously the same image is produced on paper by a laser beam or LED (Light Emitting Diode) xerography system in which the laser beam or LEDs form the reproduced image on the photosensitive drum of the xerography system. That xerography system includes the laser beam or LED electronic system to produce the image on the drum, the photosensitive drum to reproduce the image which is on the original CRT screen; and a paper path to pass paper over the drum and transfer the drum image to the paper. The paper copy may be directly viewed by the physician.

Alternatively, a laser-film system is used in which the intensity of a laser beam is controlled and the beam is scanned, raster fashion, over the surface of an undeveloped photographic film sheet, which is subsequently developed using conventional photo film developing methods.

In the printing field it is sometimes desired to make an accurate printed picture from the color image on a video monitor screen. For example, the screen may show a computer-generated image. That image is reproduced on a photosensitive material or directly on a printing plate to print a hard copy that should be similar in tone, luminance and color to the original object or scene.

It has been found that the hard copy image reproduction may vary significantly from the original image on the video monitor screen. Some of the distortions are due to the inaccuracy of the CRT screen and video image reproduction process. That type of distortion has been recognized and compensation methods have been suggested, generally dealing with the problem as it affects an entire group of video monitors. Similarly, the distortions due to the camera have been recognized and treated, generally by improvements in the optics of the camera or overall corrections in video components (brightness, contrast, etc.). However, many of the distortions are not predictable and may vary from day to day and from one device to another.

Set forth below is a discussion of the problems most frequently encountered in producing an accurate picture in the video-to-xerographic or video-to-laser beam processes as they relate to accurate tonal black-white reproduction. The contribution of each problem to the total final distortion of the picture can change in its characteristics periodically and is not predictable. For example, one day the xerographic toner mixture may be incorrect and seriously distort the picture, and the next day it may still be incorrect but have only a minor adverse effect due to partial compensation distortions from other components in the system. In addition, most of the problem-causing effects are non-linear, so that completely compensating for them in a simple direct way is impossible.

The problems with the conventional system are explained in connection with FIG. 1, which is block diagram of a conventional black-white xerographic system. As shown in FIG. 1, the video image is produced by the video source 10, which may be a video camera, a computer graphics output, or a VCR. The video signal is viewed directly on the original monitor CRT screen 11. The same video image reproduced on an internal photosensitive drum 13 in the xerographic system 14. Generally the image on drum 13 is a positive image compared to the image on monitor screen 11. The xerographic system 14 produces the final hard copy 17, preferably on plain (uncoated) paper.

Each step of this conventional process gives rise to unpredictable distortions. The first set of distortions arises in the laser xerographic system. The ratio between luminance values, i.e., the ratio between shades of gray, on the drum 13 may be inaccurate. For example, the drum may be unevenly coated with photoresponsive material or may be aged. In addition, the relationship of the signal voltage applied to the laser beam to produce an output brightness may not be linear. Consequently, the image produced on the drum 13 may not be directly proportional, i.e., accurate, compared to the image on the original monitor screen.

The xerographic system makes a copy using a conventional xerographic process. The density in such copy may not accurately reproduce the differences in the gray scale because the xerographic drum may have a non-linear "characteristic curve" of density against log exposure. The exact shape of the curve varies from one manufacturer to another and even from one drum to another.

When the toner image is transferred from the drum to the paper, distortions may arise from the variability of the process, variations in corona transfer, voltage, and variations in the paper. In those cases in which the copy is duplicated, additional distortions may occur.

In the case where the hard copy is paper and the paper is made into a print using a printer, still other distortions may arise from the dot size of the printing, the spread of the dots and the variable absorption of the ink into the paper due to various types and batches of paper. Also, the perception of the gray scale may differ depending on the type of printing process that is used.

The present invention is particularly directed to accurate reproduction of the luminance differences in value (differences in a gray scale) and absolute luminance from the image on an original monitor black-white video screen. However, in its broader aspects, the invention is also applicable to the accurate reproduction of color images. The invention is directly applicable to color images in the sense that the video screen may be a color CRT screen and the invention will correct for gray scale distortions in reproducing the image on the color screen. In addition, the reproduction of color images has its own set of problems and distortions, aside from black-and-white tonal differences. These color distortions can also be corrected, and their correction will be discussed at the end of the detailed description.

These color and luminance distortions include: (i) that the color of the photo-sensitive dyes, or the ink pigments, or the xerographic color toners do not match the color on the original monitor CRT screen and do not compensate for the color mis-match of the screen phosphors, and (ii) that the color of the color photo-sensitive papers, dyes or printing inks do not match the color of the first hard copy. In addition, the chemistry for color films and color copies is more complex, and more temperature sensitive, than for black-white film and copies, so that variations in the chemistry or temperature cause distortion shifts in the color. A further problem with color, not found in black-white images, is that the perception of color of the object or video screen (by the human eye) differs from the actual color on the film or print.

In U.S. Pat. No. 4,263,001 entitled "Apparatus and Method For Enhancement of Optical Images", in one embodiment, which is not claimed, a video camera is connected to an electronic image modification device which, in turn, is connected to a single frame storage (to prevent feedback) and a monitor CRT.

In U.S. Pat. Nos. 4,492,987 and 4,520,403, both entitled "Processor For Enhancing Video Signals For Photographic Reproduction", the screen of an electronic camera is electronically modified to enhance photographic reproduction. The entire screen is treated as a unit and its brightness or color is changed in accordance with the distortion introduced by a selected photographic film.

In U.S. Pat. No. 4,658,286 entitled "Method and Apparatus For Correcting Distortions In Reproducing Systems", a type of feedback system is described. In one embodiment three photocells look at a corner of the CRT screen having test colors and their outputs are compared to reference colors.

OBJECTIVES AND FEATURES OF THE INVENTION

It is an objective of the present invention to provide a more accurate black-white and color hard copy taken from the image on a original video monitor screen in which the hard copy reproduced image more accurately maintains the relative and absolute tonal scale of gray tones as in the original video screen; regardless of the distortions or inaccuracy of that original screen image as compared to an ideal image or the object from which the image is taken.

It is a further objective of the present invention that the reproduction device be compensated to obtain the accurate hard copy image and that such compensation takes account of short term, for example, daily distortions, and long-term distortions and fixed sources of distortions.

It is a still further objective of the present invention that the operator is alerted to excessive deviations from a standard of tonal reproduction so that he may take immediate corrective action to restore the system so that it will produce reproductions whose tones accurately reproduce the tones of the original screen image.

It is a feature of the present invention to provide a method and system for the accurate tone reproduction of the luminance ratios and accurate color reproduction in an image. In one embodiment the original image may be viewed on an original monitor CRT and it is also reproduced by a laser beam. The laser beam device has means to vary the density values (brightness-darkness) of each small area ("dot area") on a xerographic drum or a photographic film sheet. In one example, a test image is made on the xerography system, the test image having areas differing in density, for example, a ten-segment gray scale. The test image is reproduced using the same batch of paper, as will thereafter be used and the paper copy is produced using the same toner and conditions as will thereafter be used. In another example, a test image of the same type is made on the photographic film and the film is developed using the same chemical and conditions as will thereafter be used. In both examples, a photoelectric densitometer is used to test the densities of the test patterns on the hard copy images. The density values, in digital format, are entered into a video processor computer having a look-up table whose entries are compared to table entries representing the luminance for each tone of the original video monitor screen. The look-up table provides a compensation value for each of the tones which constitute the image on the drum.

When a certain dot area is to be activated on the xerographic drum or the photographic film, its original dot density value is compensated for by the compensation value. Consequently, for example, an original lighter gray tone may be compensated to become brighter and an original darker gray tone may be compensated to become darker. In this way, in the same latent image (on the drum or on the undeveloped film), some areas are made brighter and some areas are made darker, in order to compensate for the distortions arising from the reproduction process.

SUMMARY OF THE INVENTION

The present invention uses the same components as a conventional system and, in addition, uses additional means to provide a rapid compensation so that the black-white tones (ratios of luminance differences on a video screen) and the color are accurately reproduced.

The system, in one embodiment, uses a video source, such as a computer graphics output, VCR or video camera to produce an image on a CRT monitor. In one embodiment, the video source simultaneously also produces a direct (non-reversed) latent image on the drum of a xerographic system or on a sheet of undeveloped photographic film using a laser beam system.

The laser beam system is connected to a computer having a look-up table memory and an image memory. The computer's image memory processes each frame of the video image on a pixel-by-pixel basis in digital form. A black-white gray scale test pattern is formed as a latent image on the drum or the film, the test pattern having preferably at least 10 gray-scale areas. In the xerographic system the test pattern is reproduced as a positive image on paper. In the photographic system the test pattern is reproduced as a positive image on the developed film. The test pattern is then sensed by a densitometer which provides an electrical signal corresponding to the gray-scale density of the test pattern. The densitometer's output, in digital or analog form, is entered into the computer. The computer, using its look-up table memory, will determine the required compensation, on a dot-by-dot basis. That compensation is applied to each video frame which passes through the computer's image memory.

The computer memory includes a "standard" set of density values corresponding to the luminance values for each tone. That "standard" set is obtained by measuring the luminances on the original monitor screen using a spot photometer, of a tonal test pattern. Preferably, the same ten scale test pattern is used on the original monitor screen and on the hard copy reproduction. Those standard values are compared to the actual values, from the densitometer, to provide the required compensation. The compensation is non-linear so that making the entire video screen darker or brighter will not compensate for the distortions in the ratios between the tones. Instead, each tone requires its own compensation. Since the hard copy image is composed of different tones in different areas, the density (brightness) value of each tiny area (dot area) is individually compensated to produce the tonal reproduction accurately.

Other embodiments of the present invention include other types of hard copy reproduction systems in place of a xerography system. Such alternative systems include: (i) a laser-film system in which such a corresponding latent image is formed by a laser beam directly on photo-sensitive photographic film; (ii) an ink-jet system in which the corresponding image, in this case a visible image, is formed by ink dots from an ink jet printer on paper; and (iii) a thermal imaging system in which dyes or other imaging materials are transferred to a substrate, such as paper or film, or activated in a substrate, to show a visible image, after processing; (iv) a diffusion transfer system in which dyes, pigments or other imaging materials are transferred from a exposed layer to a receiving layer to form a visible image. For example, in instant photography a laser beam exposes a negative photographic layer which is in physical contact with a receiving layer. Black, or color dyes or pigments, are transferred, in the areas activated by the laser beam, from the negative layer to the receiving layer to form the final visual positive image; and (v) a material transfer system in which imaging materials are transferred from one layer to the other creating either a void or an addition of imaging materials in the respective layers. The exposing beam can change the properties of the exposed layer to affect its, and the adjacent layers', imaging properties. For example, in the Polaroid Medical Imaging Camera it is believed that a laser beam exposes an energy sensitive layer with considerable heat energy. The energy sensitive layer incorporates imaging elements such as carbon black powder inside a gelatin layer for black and white final image. The exposed areas change their properties, they become softer, or less attached to the substrate, etc. to such an extent as to become transferable to a receiving layer during separation. The receiving layer is placed into contact with the exposed layer and then pulled apart, thus providing a negative and a positive layer simultaneously, depending on the exposed light areas and the polarity of the working system. This system does not requite any chemical processing after the layers are pulled apart.

BRIEF DESCRIPTION OF THE DRAWINGS

Other objectives and features of the present invention will be apparent from the following detailed description of the inventor's presently known best mode of practicing the invention, taken in conjunction with the accompanying drawings.

In the drawings.

DETAILED DESCRIPTION OF THE INVENTION

The present invention relates, in the below-described first embodiment, to the accurate xerographic (electrographic) reproduction of the black-white tone of an image on the CRT screen of a video monitor. The "tone" of an image is the ratio between its luminance values or brightness of the screen image. That tone ratio is sometimes called "luminance differences" or "shades of gray" or a "gray scale".

In a xerographic system a photoconductive member, generally a drum or belt, records an image. Its surface is uniformly charged, by a corona discharge charger, and its surface is selectively charged at spots (dots) by an electro-optical source (optical printhead) generally a laser beam or a LED array, to form an electrostatic latent image. That latent image is developed, by contact with toner, into a powder image which is transferred to a sheet of paper ("substrate") by a transfer corona discharge device, and the powder is fused to the paper to form a hard copy image.

An accurate reproduction of the ratio of luminance values (gray scale) would occur when the density units on the hard copy directly correspond (linear relationship) to the gray scale on the monitor screen. The density units on the hard copy is a measure of the blackness of the printing (toner) on the hard copy. Density is defined as the log 1/reflectance of an opaque substrate, in this case the xerographic paper copy. The "screen luminance" is the brightness of the CRT screen, or a portion of the screen, and is measured in terms of "log screen luminance" to directly correspond to density which is also a log function.

The video monitor CRT screen is divided into "pixels" with the pixels arranged in columns and rows. The number of pixels which is selected depends on the original image generator, i.e., medical scanner output, VCR or computer, as well as the screen size of the monitor, the video electronics of the monitor and the video system which is used. In the United States there are various standards of video systems for medical purposes. For convenience, we may consider a system of 1000 horizontal lines and each line may be considered as 1000 pixels so the total number of pixels comprising the monitor CRT screen is 1000×1000, or one million pixels. In the case of an 8-bit digital system, each pixel has a black-white gray scale of 256 values which ranges from 0 (blackest) to 255 (brightest), on the monitor screen.

Figure 2:
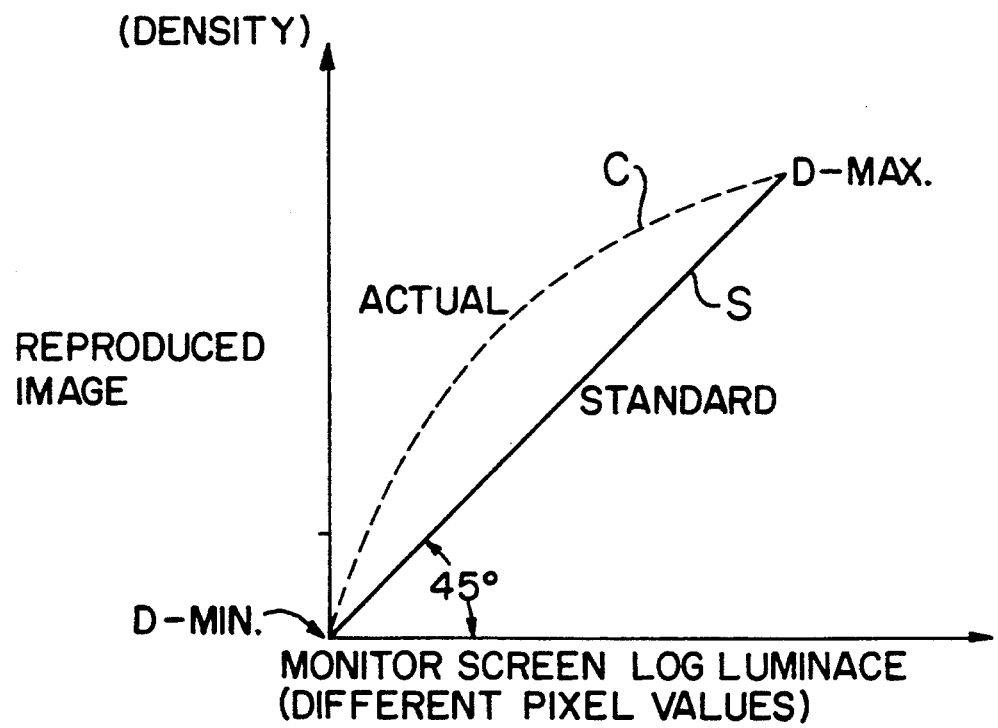
FIG. 2 is an X-Y graph showing the density in the reproduced hard copy image plotted against a viewing monitor video screen log luminance, i.e., different pixel values.

As shown in FIG. 2, it is relatively simple for the reproduced image to have the required minimum density (D min) and maximum density (D max) which is set by the reproduction system limits. However, the gray scale on the reproduced image may be a non-linear actual curve C which differs from the standard gray scale S which is linear. In all examples the "standard" curve is the ideal curve representing the actual image characteristics of the video monitor screen. In FIG. 2 it is shown as being linear, although in many cases it may be non-linear. FIG. 2 plots the density of the reproduced xerographic image against the monitor CRT screen log luminance (brightness). This is only one imaginary example of a non-linear relationship.

The present invention approaches the standard gray scale of curve S (the curve of the monitor screen) by electrically adjusting the value of dots printed on the hard copy. If the hard copy print density is below the standard curve, then the density of the dot is raised, so that the final density of the dot on the hard copy corresponding after such compensation, is on the standard gray scale line S.

Figure 1:
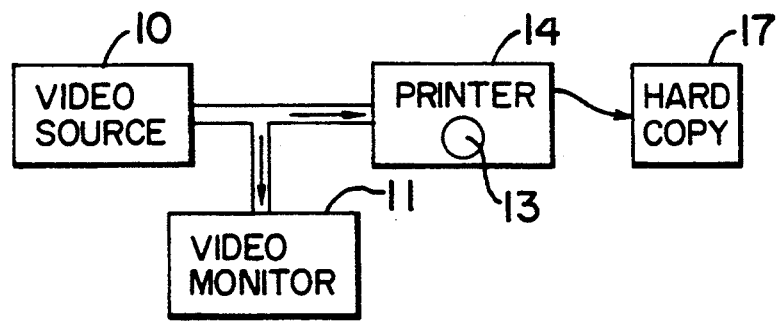
FIG. 1 is a block diagram of a prior art system to produce xerographic copies of a video screen image.
Figure 3:
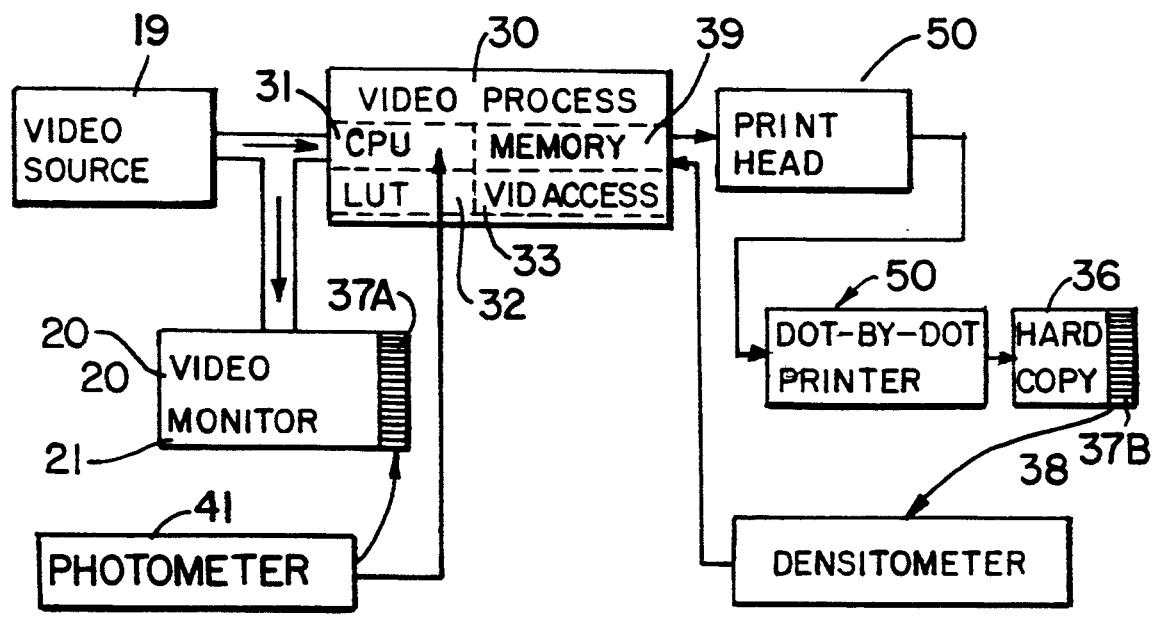
FIG. 3 is a block diagram of one embodiment of the system of the present invention.

As shown in FIG. 3, a block diagram of the first embodiment, a monitor video 20 includes a CRT screen 21. The monitor 20 shows an image which in this embodiment is a black-white image generated by video source 19. Alternatively, the image may be a color image in which case correction of the tone on the reproduction will by itself, and without correction of color, greatly improve the accuracy of the color reproduction.

The monitor 20 is preferably a high resolution video monitor having 1000 horizontal lines per video frame, each frame consisting of two interlaced fields each of 500 horizontal lines. There is no attempt, in this example, to enhance the image on the monitor 20; but only to enhance the reproduced hard-copy image so that it accurately matches the image on the monitor screen. Often the gray scale on the monitor screen will not be an accurate reproduction of an ideal gray scale, for example due to imperfection in the CRT tube, the age of the CRT tube, imperfect adjustment of the brightness and/or contrast controls on the monitor, room lighting conditions, etc. However, the hard copy image will be an accurate reproduction of the gray scale tones as they actually appear on the monitor screen, and not an ideal image.

Figure 7A:
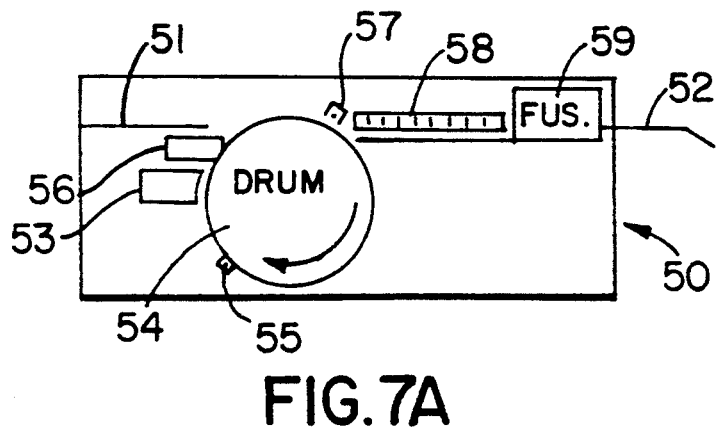
FIGS. 7A–7C are various types of dot-by-dot hard copy printers.

The same image which appears on the monitor screen 21 is reproduced on the drum 54 of the dot-by-dot xerographic printer 50, see FIG. 7A. The xerographic printer 50 includes the electro-optical system 53 to produce the latent image on the photosensitive drum 54. The image on the drum 54 is preferably a non-inverted black-white version of the image on the screen 21 of the monitor 20.

The xerographic printer 50 is connected to the electronic processor 30 which is the computer means to calculate the correction values and to control the printing of the printer on a dot-by-dot basis. In this example, the drum 54 is a one-to-one mapping of the monitor screen and has a frame (image) of 1000 horizontal lines per field and is preferably divided so that each line has 1000 dots for a total of one million dots per frame (image) on the hard copy.

The processor 30 includes a digital microcomputer, for example, Intel, having a CPU (central processing unit) 31. The processor has three digital memories, which are preferably solid-state VLSI chips (Very Large Scale Integrated). The first memory 32 is a read-write LUT look-up table which includes, as one set of data held therein, the correct predetermined density value that a dot should receive to correctly portray each tone of the gray scale ("standard value") so that the tone accurately matches the same tone on the monitor screen 21.

Preferably, the system does not use image memory storage. Instead each pixel is converted "on the fly" in real time to its adjusted (corrected) value using the look-up table (LUT).

An alternative to a real time system is to use a second memory (access memory) which stores at least one field of the digital memory. In this context a "field" is the dot-by-dot matching of the one million dots which are produced on the xerographic drum 54 to the one million pixels of the video monitor screen 21. The access memory may use a video access memory, which is characterized by a serial access port through which the video data can be input and output independently of other memory signaling and timing requirements. The present state of the art in these components is a 64K×4 device solid-state integrated random access memory circuit ("RAM chip") with an internal 256×4 serial access buffer. Suitable devices are Hitachi (HM53461 or HM53462), Fujitsu (MB81461), and Mitsubishi (M5M4C264) for NTSC video signals.

The hard copy 36 is produced, in conventional manner, in the xerographic printer 50. The xerographic printer is preferably the type which generates an image directly on the drum from its electro-optical transducer and preferably is a laser device or a LED (light emitting diode) device. For example a LED device is described in U.S. Pat. No. 4,721,977 and a xerographic device is described in U.S. Pat. No. 4,752,805, both incorporated by reference herein.

In a LED system a LED array, for example 2500 fixed light sources, are arranged in a row across the width of a page and their dots of light are focused by a lens focusing array on a photoconductive drum. In a laser beam system a single laser beam is swept across a page by a rotating mirror and is rapidly turned on and off to create dots (charged or discharged dot areas) on the photoconductive drum. A typical high-quality xerography laser beam or LED printer will print at 5-20 pages per minute, and have a resolution of 200-500 dots per inch.

In a high quality xerographic printer with a dot density of 500×500 image size there are 18,750,000 dots (250k×7.5×10). The density, in one embodiment, is formed as follows:

Each area 1/100×1/100 square inch is considered a "dot area". The number of dots printed in the dot area corresponds to the pixel value ranging from 0 to 255 and divided by ten, i.e., 0 to 25. For example, for medium density 13 dots are printed in the dot area (1/10,000 sq. in.) and evenly distributed in the dot area.

The 7½×10 printed image consists of 100×100×7.5×10=750,000 dot areas.

A densitometer 38, for example, Macbeth TR-944, having a digital output, is connected to the video processor 30. The densitometer measures the density values of the test pattern 37B on the hard copy 36. The test pattern is preferably a band of 11 side-by-side panels of different predetermined tones of gray forming a gray scale. Alternatively, the gray scale may be obtained from a series, for example, 11 hard copies made in sequence. The density measured on hard copy 36 appears in a digital electrical signal at the output of densitometer 38.

The digital values representing the actual densities of the gray scale of the test pattern are entered into the computer processor 30 which forms a new look-up table 32. For each actual density value of a gray tone there is, stored in the look-up table 32, a "standard" value obtained from the monitor screen 21.

Figure 4:
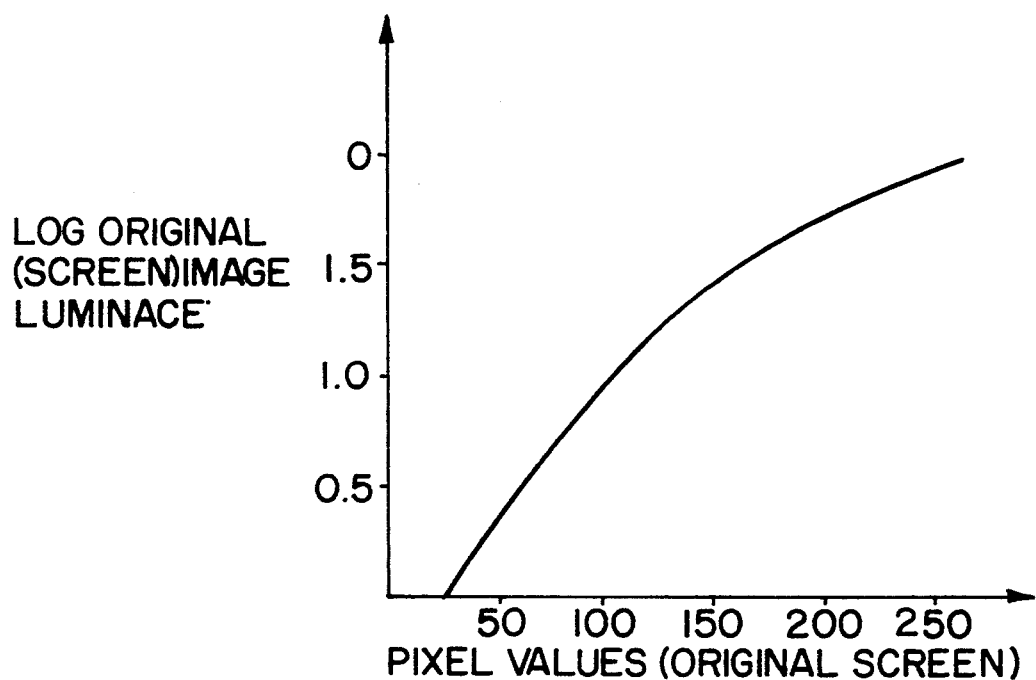
FIG. 4 is an X-Y graph in which log original screen image luminance on the Y axis is plotted against the screen pixel values (0–255) on the X axis.
Figure 5:
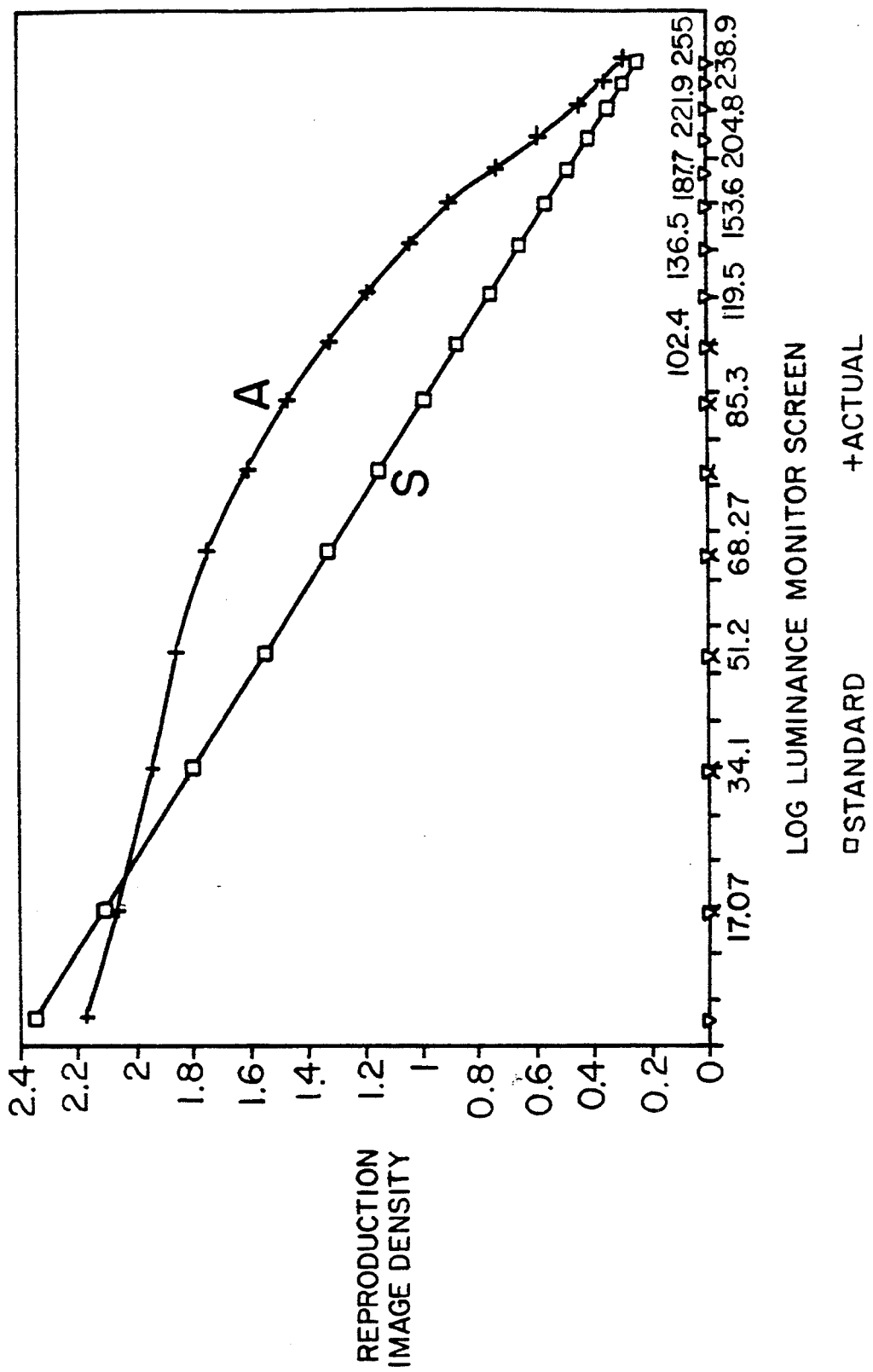
FIG. 5 is an X-Y graph in which the reproduced image density on the Y axis is plotted against the log original monitor video screen intensity (luminance) and screen pixel values.

The value of the density corresponding to the luminance of the monitor screen is obtained as follows: The luminance value of any pixel value or its representation through the test pattern (at any particular screen and ambient lighting condition combination) is found using a spot photometer 41, for example, the Minolta LS-100. A graph of pixel value vs. log original screen luminance is constructed (FIG. 4). The graph of FIG. 5 is then constructed based upon the actual luminance values of FIG. 4. In FIG. 5 the dual values of log intensity of the screen and the actual pixel values of these screen luminances are marked simultaneously on the X-axis.

The density values of the hard copy, i.e., the reproduction image density, as measured by a densitometer, are shown plotted on the Y-axis of FIG. 5. There should be a linear relationship in FIG. 5, shown by the standard curve S, between hard copy density and log video monitor screen luminance. The actual curve A, which are the densities as measured by the densitometer on the test pattern, is not linear.

software (computer programs and memory) to establish the standard dot-to-dot values for each gray scale tone.

The graph of FIG. 2 is the basis to construct the graph of FIG. 5 showing dot values vs. (Standard and Actual) densities.

Figure 6:
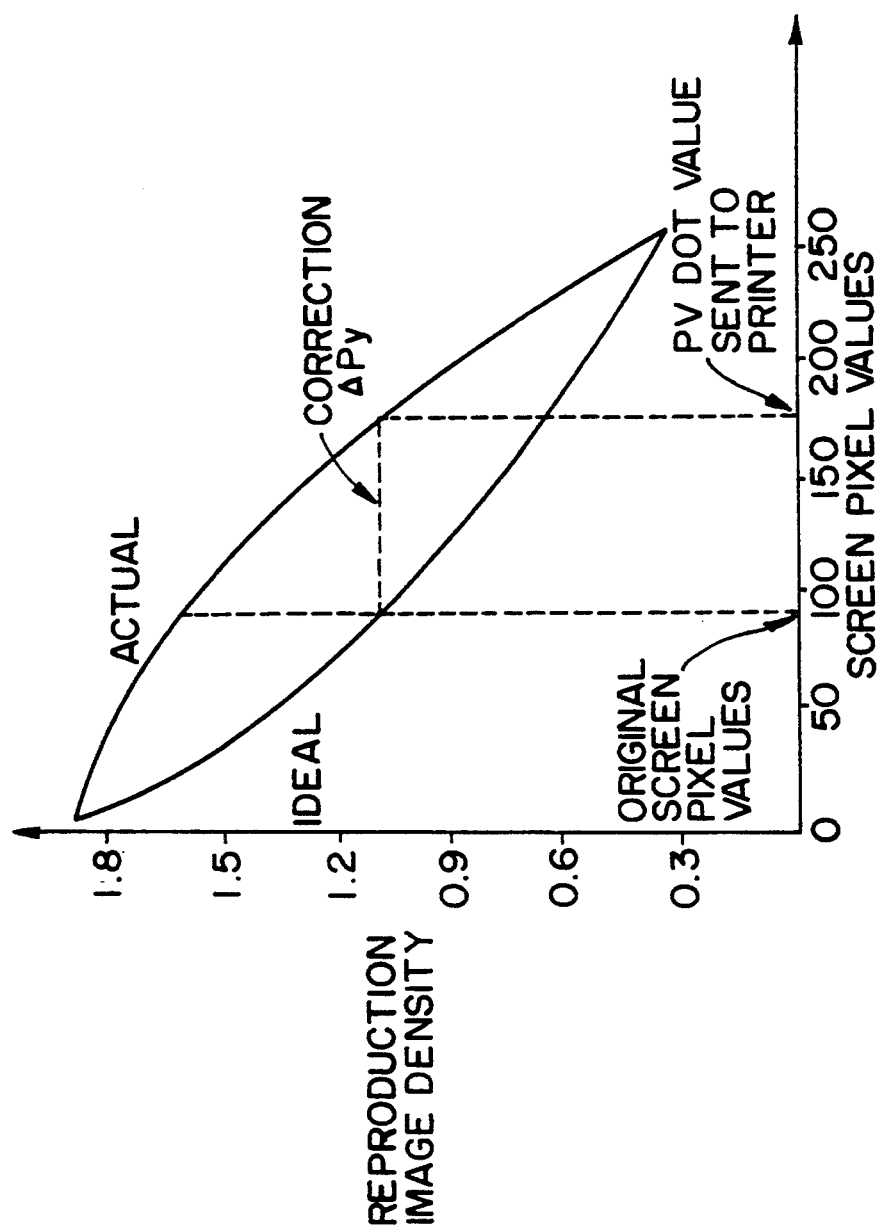
FIG. 6 is an X-Y graph in which the reproduced image density on the Y axis is plotted against the original screen pixel values on the X axis.

The standard pixel value is found in FIG. 6 as described above. Every monitor screen pixel value is associated with a corresponding print dot density value. The values of all the monitor screen pixel values and their corresponding print dot density values are entered in the look-up table (LUT) memory 32.

Using the LUT memory 32, each dot print density value is changed based upon the corresponding monitor pixel value. This correction yields an accurate reproduction density on the hard copy which follows the standard tone curve of the monitor screen.

An example is as follows:
1. Generate a gray scale test pattern of known pixel values of distinct steps (e.g., the SMPTE RP-133 of 11 steps of pixel values, in the form of side-by-side bands). The preferred pixel values are: 0, 25, 50, 75, 100, 125, 150, 175, 200, 225, 255.
2. Measure the screen luminance values on the screen of the video monitor 20 of these pixel values of the test pattern 37A with the spot photometer. Then reproduce this test pattern (screen image) with a xerographic system calibrated to give the desired Dmin and Dmax of the reproduced image (i.e., a well calibrated xerography system). Measure the densities on the hard copy using the densitometer. Construct FIGS. 4, 5 and 6 in that order.
3. From FIG. 6 construct the LUT 32. The LUT 32 will feed their values to the computer program which programs CPU 31 so that each print dot value is changed to the appropriate value. This yields an accurate density for the tone reproduction on the hard copy 36 of the tones on the monitor screen 21.

The following table can be used for illustration:

| 1 | 2 | 3 | 4 | 5 | 6 | 7 | 8 | 9 | 10 |
|---|---|---|---|---|---|---|---|---|---|
| TEST PATTERN STEP NUMBER | MONITOR SCREEN PIXEL VALUES | MONITOR SCREEN LUMINANCE VALUES cd/m.. sq | LOG SCREEN LUM. | IDEAL RE-PRODUCT DEN-SITY | HARD COPY UNCOR-RECT PIXEL INTEN-SITY | HARD COPY UNCORR. DENSITY VALUES | D DIFFERENCE BETWEEN IDEAL AND UNCORR. DENSITY | Pv COR-RECTED SECOND SC PIXEL VAL | Pv CORRESPONDING DIFFERENCES IN REPRODUCTION PIXEL VALUES |
| 1 | 0 | 0.8 | −0.09691 | 1.95 | 0 | 1.95 | 0 | 0 | 0 |
| 2 | 25 | 1 | 0 | 1.86 | 25 | 1.91 | 0.05 | 30 | 5 |
| 3 | 30 | 2 | 9.301029 | 1.6 | 50 | 1.73 | 0.13 | 68 | 18 |
| 4 | 75 | 4 | 0.602059 | 1.35 | 75 | 1.52 | 0.17 | 95 | 20 |
| 5 | 100 | 9 | 0.954242 | 1.05 | 100 | 1.26 | 0.21 | 127 | 27 |
| 6 | 125 | 16 | 1.204119 | 0.83 | 125 | 1.05 | 0.22 | 155 | 30 |
| 7 | 150 | 25 | 1.397940 | 0.66 | 150 | 0.85 | 0.19 | 178 | 28 |
| 8 | 175 | 37 | 1.568201 | 0.51 | 175 | 0.68 | 0.17 | 203 | 28 |
| 9 | 200 | 51 | 1.707570 | 0.38 | 200 | 0.51 | 0.13 | 220 | 20 |
| 10 | 225 | 70 | 1.845098 | 0.26 | 225 | 0.34 | 0.08 | 232 | 7 |
| 11 | 255 | 93 | 1.968482 | 0.15 | 255 | 0.15 | 0 | 255 | 0 |
| VALUES OBTAINED FROM: | | | | | | | | | |
| TEST PATTERN | TEST PATTERN PIXEL VALUES | PHOTOMETER | | FIG. 5 OR EQUIQTION 1 | TEST PATTERN PIXEL VALUE | | DENSITOMETER CALC. COL. 7 MINUS 5 | FIG. 6 | FIG. 6 |

FIG. 6 is derived from FIG. 5. In FIG. 6 the x-axis uses only the screen pixel values. The various curves of the Figures are intended primarily as illustrations of the principles. In practice, the procedure is to use digital The following mathematical table tools help in reducing most of the labor described above:

1. Instead of constructing FIGS. 5 and 6, the standard density is calculated as follows (to a close approximation):

Standard density = log (actual luminance values) * [Dmax − Dmin / log luminance max. − log luminance min.] + Dmax − [Dmin / log luminance max. − log luminance min.] * log luminance min.   Equation 1:

2. Instead of measuring the standard Pixel Value (Pv) for a particular density it is calculated as follows (to a close approximation):

Standard Pv = PV of existing density + ΔPv when ΔPv = (1/local slope of ΔD/ΔPv at point of measurement)*ΔD   Equation 2:

3. Instead of measuring all the values of the LUT 32 from FIG. 6 (or using all the calculation values for all possible densities) only the 11 values of the test pattern pixel values and corresponding Standard and Actual Densities are fed into the computer program which is programmed to extrapolate the intermediate values using, for example, polynomial calculations.

QUALITY ASSURANCE PROGRAM

Once the standard dot print values are found and the corrections made, the corrected dot-by-dot values are inserted into the signal going to the electro-optical transducer, i.e., the laser beam or LEDs.

Any periodic change in the characteristics of the xerographic system toner, corona voltage, temperature, etc. will create a new distorted curve (in FIGS. 2, 4, 5 and 6) which will be different from the actual hard copy curve previously obtained.

The same method is used to compensate for the new distortion as with the original corrections. Preferably daily a new set of LUT for the new dot print values are constructed (as before) to yield a tone reproduction on the hard copy of the tones on the monitor screen.

One assumes that the toner has been replenished and the uncorrected resulting hard copy image has higher density values than required by the standard tone reproduction relationship (FIG. 5). (monitor image remains constant for now)

In this example only columns 7, 8, 9, 10 in the above table, should be modified:

Column 4: The new resulting densities are read and fed into the calculations (equation 2) to find: the change in densities from the known standard densities the standard dot print values associated with the new correction, and the change in the standard values.

This will provide the new standard densities on the reproduction.

Preferably the densitometer 38 is connected to the processor 30 (computer means) via RS-232 connection. Preferably the reading is automated using a special purpose scanning densitometer. This will allow, in this example, a simple and quick improvement of the system. All that is required is to read the 11 steps of the reproduced test pattern 37B with the connected densitometer 38 and the system calibrates itself.

To allow even the end-points to be modified when necessary (Dmax and Dmin which are also modified by the changes in the xerographic system characteristics) the xerographic system is calibrated so that the required Dmax will be reached, for example, for a density value corresponding to a pixel value of 25 (instead of zero) the Dmin will be reached at a density value corresponding to a pixel value of 225 (instead of 255) allows automatic changes in the highest and lowest density values. In this case the only additions to the graphs or calculations are the extrapolation values of the curves beyond the existing highest and lowest pixel values.

Modifications

Modifications, some of which are suggested below, may be made in the present invention within the scope of the subjoined claims.

The embodiment described above uses a digital computer and image frame memory to correct the density of the dots on the hard copy. Alternatively, an analog computer system may be utilized or an analog or digital system may be used in which each dot area is compensated as that dot area is being printed.

An absolute luminance reproduction, as well as the relative luminance reproduction described above, may be obtained as follows: (i) the density of the hard copy reproduction is controlled, and (ii) the linear tone reproduction curve is maintained at 45°, see FIGS. 2 and 5, and the viewing light source is modified to give similar absolute reflected luminance from similar gray levels of the original image on the screen and its hard copy reproduction. If necessary, a substrate similar to the original characteristics is chosen.

Such absolute luminance reproduction is not always required. If a linear relationship is required, but absolute luminance reproduction is not required, the tone reproduction curve is straight, but its angle need not be 45°. For example, the 45° line in FIGS. 2 and 5 may be changed to a straight line at 60° to provide a hard copy reproduction with higher contrast and with linear tone reproduction, i.e., linear relationship between tones.

In those cases in which a distorted tone reproduction is required, i.e., non-linear and/or non-absolute, the desired distorted curve may be entered on FIGS. 5 and 6 in place of the standard curves. The correction in densities to obtain the distorted curve may be obtained and their values entered into the look-up table 32.

In the embodiment described above, the screen was divided into one million pixels. However, the number of pixels is at least 100,000 and may be as many as 100 million.

An alternative to xerographic printing is ink jet printing. One ink jet system uses an array of holes in a manifold block. Ink is pumped out in droplets from the holes and the droplets are directed, by an electric field, either to the paper (substrate) or to a dump. In another ink jet system, for example, the "Quietwriter" (Hewlett-Packard, California), droplets are diverted by an electric field to hit the paper in selected locations. It has, in "double density mode", a dot density of 192 dots per inch ("dpi") × 384 dpi or 73,728 $dpi^2$. If the "dot area" is 1/50 inch × 1/50 inch, then its maximum dot density is 29 dots so that each level of a 10-level gray scale is represented by 3 dots in the dot area. For example, level 5 (medium tone) has 15 dots in a 1/50 × 1/50 area. The compensation and computer control system for the ink jet system is the same as for the xerographic system. However, in the case of the ink jet systems the density of the dots is controlled, to form the gray scale, by control of the ink jet head.

Another alternative printing method is a dye transfer system such as the "Cycolor" system (Mead Imaging, Dayton, Ohio). In this system a substrate is covered with a layer of microcapsules which are small bubbles (about a micron in size). The microcapsules are light sensitive and contain laco dyes. In a negative working system, light exposure hardens the bubble, enabling it to resist pressure. After exposure to light the substrate is subject to uniform pressure ("development"). The unexposed bubbles rupture, under the development pressure, and spill their laco dye onto a receiving layer that contains an acidic material, rendering the dye black. The laco dye is transparent in basic environment and black in acidic environment (like an indicator). This creates an image of the unexposed areas on the receiving substrate.

The light exposure is usually obtained by laser beam scanning, which creates a positive image on the substrate.

The laser beam in the Cycolor system is controlled in the same manner as in the xerographic system, described above, to create an accurate reproduction of the image on a video monitor. In this system the "dots" are the individual microcapsules or the smallest group of such microcapsules which may be defined by the laser beam. The "dot area" is the smallest feasible area whose density (blackness) may be controlled by changing the number of dots in the area. For example, a dot area may be 1/100 in.×1/100 in. and the number of dots in each area varied from 0 to 255.

In the xerographic, ink jet and dye transfer systems described above, the printed density on the hard copy was varied by changing the number of dots in an area ("dot area"), each of the dots being the same size. Alternatively, the density may be varied by changing the sizes and/or shapes of the dots. For example, in the xerography system, to go from tone 2 to darker tone 4 the size of the dots is increased but the number of dots remains the same. Both types of density changes (number of dots in an area or size of shape of dots) is within the term "dot-by-dot" basis, as used herein.

The present invention may also be applied to other types of hard copy printing methods. For example, in one type of "halftone" reproduction the gray scale of a monitor video image is reproduced in half-tone, which consists of dots of different sizes.

Darkness is produced by larger black dots and lightness by smaller black dots. Such halftones may be produced by photographing the monitor screen, or producing a photograph using an electronic camera having a second video CRT screen. The photographs are made using a halftone screen, generally a crossline hatched transparent plate. For printing, a square halftone screen may be used. The density of the final hard copy, i.e., the final print, is measured by a densitometer using a test pattern. The densitometer values for each tone of the test pattern is compared, in the video processor computer, with the luminances as measured by the photometer on the screen of the video monitor. That comparison, as described above, provides a set of compensating values for each tone so that the print producing system may be adjusted. For example, the halftone dots may be electronically engraved by a stylus in which case the dot size is adjusted by control of the electric engraving stylus.

In addition, some printing methods use photosensitive presensitized plates, for example, in photolithography using aluminum or paper plates. The plates may be formed directly by exposure to a laser beam. In this case the compensation of the laser beam may be, as described above, in the laser beam xerographic system.

As another modification, the monitor video screen may be controlled so that its gray scale tones match the gray scale tones of the hard copy. In this modification the processor 39 is a video processor connected to, and controlling, the video monitor 20. The densitometer 38 will read the test pattern 37 on hard copy 36 and those readings will be the "standard" stored in LUT 32. The screen 21 of monitor 20 will be corrected on a pixel-by-pixel basis, based upon the "standard", for each video frame.

As shown in FIG. 7A, a typical xerography (electrographic) printer 50 includes a paper input tray 51 and a paper output tray 52. An optical print head 53, for example, a laser beam or LED array, forms a latent image on photosensitive drum 54, which has been charged by corona discharge device 55.

The toner cartridge 56 forms a powder image on the drum and the powder image is then transferred to the paper by corona discharge device 57. The paper is removed from the drum by a pick-off finger or a corona (not shown) and transported to the fuser 59 by vacuum transport 58, see U.S. Pat. No. 4,664,507, incorporated by reference herein.

Figure 7B:
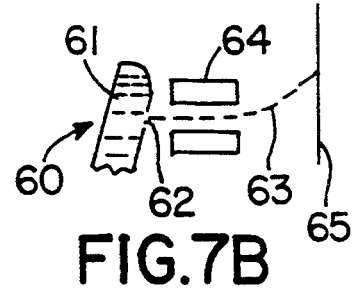

As shown in FIG. 7B, a typical ink jet printer includes the head 60 having ink 61 therein, which is under pressure and which exists from its surface 62 in a stream of droplets 63. The electro-responsive droplets 63 are directed by a deflection plate 64 to hit the paper substrate 65 in the selected dot pattern density.

Figure 7C:
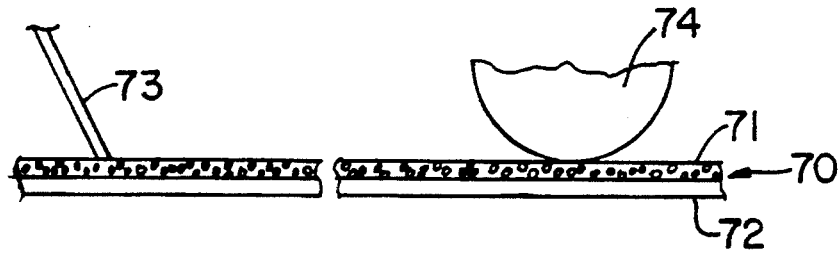

In FIG. 7C a dye transfer printing system includes a substrate 70 having a top layer of microcapsules 71 with a laco dye and a bottom layer 72 having an acid material (acid environment). The microcapsules 71 are hardened, in selected dots, by laser beam 73. In a subsequent step the substrate 70 is crushed by roller 74, which breaks the unhardened microcapsules causing their laco dye to penetrate the acid bottom layer 72 and from black at selected dots.

The present invention is applicable to improve the accuracy of reproduction of color images for the graphic arts. For example, in a graphic arts color system a spectrometer measures the values of hue, chroma and brightness of a color test pattern on the monitor screen. The output of the spectrometer is converted, if necessary, to digital form and entered into a separate look-up table in the video processor to provide the monitor screen values of red, green and blue (R, G, B) for each pixel. A hard copy, for example, color xerography copy, is printed of the test pattern on the monitor screen and the color of the printed test pattern is measured using a color densitometer. The color corrections are entered into the color look-up table using the method described above in connection with tone. The color xerographic printer is then corrected, on a dot-by-dot basis, using the corrections from the color look-up table. Preferably both tone and color are corrected to produce accurate color reproduction.

Figure 9:
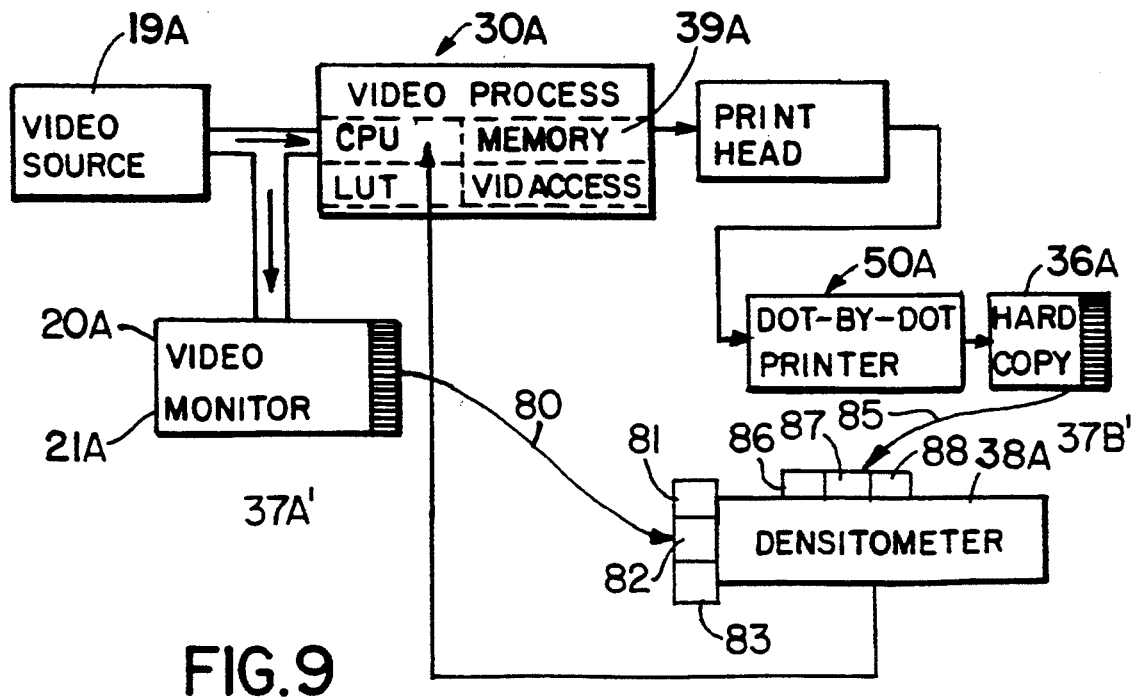
FIG. 9 is a block diagram of another embodiment of the system of the present invention.

A preferred color system is shown in FIG. 9. In that figure, which is similar to the system of FIG. 3 in many respects, the video source 19A is a source of color video, for example, a color computer display, a color TV picture, or a color medical image. In a color computer display, for example, each pixel of the monitor screen is assigned, in corresponding location in computer memory, an 8-bit number (between 0 and 255).

Each number corresponds to a description of a color from a color look-up table in RAM computer memory. The look-up table tells the video circuits of the video monitor 20A how much red, green and blue light to display on the color monitor screen 21A for each pixel. The video tube's electron guns fire at the video tube's phosphors, causing them to glow and the user's eyes see red, green and blue triads causing the colors to merge and form a colored pixel. A greater range than 256 colors may be obtained by using a 24-bit color board which generally requires a video card expansion kit. The video monitor 20A displays a test pattern 37A'; for example, the test pattern may be a color chart of many colors, or a color chart of three primary colors (red, green and blue), or preferably a strip of patches of gray tones (gray scale test pattern), each tone being composed of varying amounts and intensities of red, green and blue. The test pattern 37A' on the screen 21A is monitored by an optical fiber cable 80 which has separate optical fiber strands leading to three primary (red, green, blue) narrow band optical filters 81, 82 and 83. The software (computer program of the video processor) may correct for any distortions due to the optic fiber cable, although if the same cable filter is used for the monitor and the hard copy, such fiber optic color distortions should not have any appreciable effect.

The filters 81–83 are the inputs to a densitometer 38A. The same densitometer 38A is used, with a different fiber optic input 85 having three color filters 86,87,88 (red, green and blue) to measure the color in the color film hard copy 36A by measuring the light in each color band transmitted through the developed color film negative (or positive). The film negative hard copy 36A has a test pattern 37B' which corresponds to the test pattern 37A' on the color monitor screen 21A, for example, a gray test pattern. Preferably the filters 81–83 and the filters 86–88 are colorimetric filters which are status A densitometer filters simulating tri-color narrow cut filters. Such filters permit the densitometer to evaluate the relative amounts of red, green and blue light in each area of the gray scale test pattern or other test pattern. Alternatively, optical narrow band glass filters may be used such as Green No. 342C, Red No. 185C, and Blue No. 280C. Preferably the same filters are used to test both the monitor and hard copy, although for mechanical convenience separate and matching sets of filters may be used for each. The reproduction of the test pattern on the hard copy should be under illumination simulating the actual viewing conditions under which such hard copy will be viewed. The filters and their connected optic fiber cables may be formed as a head which may be manually or automatically rotated to present either the filters 81–83 or the filters 86–88 as the input to the densitometer. The filters 81–83 may be presented in sequence and automatically, and then the filters 86–88 presented in sequence and automatically, so that the densitometer measures light of one color at a time from the monitor and then measures from the hard copy.

Figure 8A:
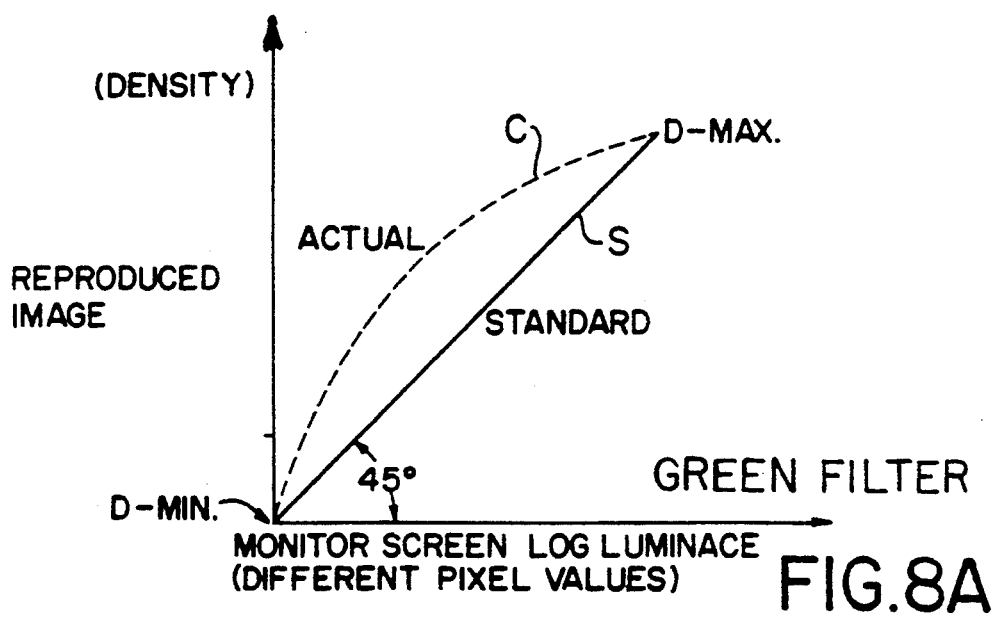
FIGS. 8A–8C are X-Y graphs in which the reproduced image density on the Y axis is plotted against the original screen log luminance on the X axis for the red filter, green filter and blue filter, respectively.
Figure 8B:
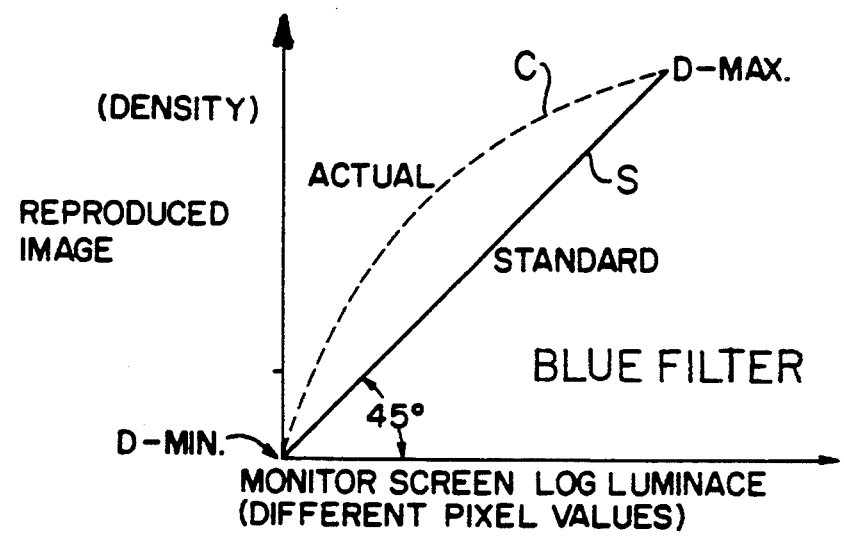
Figure 8C:
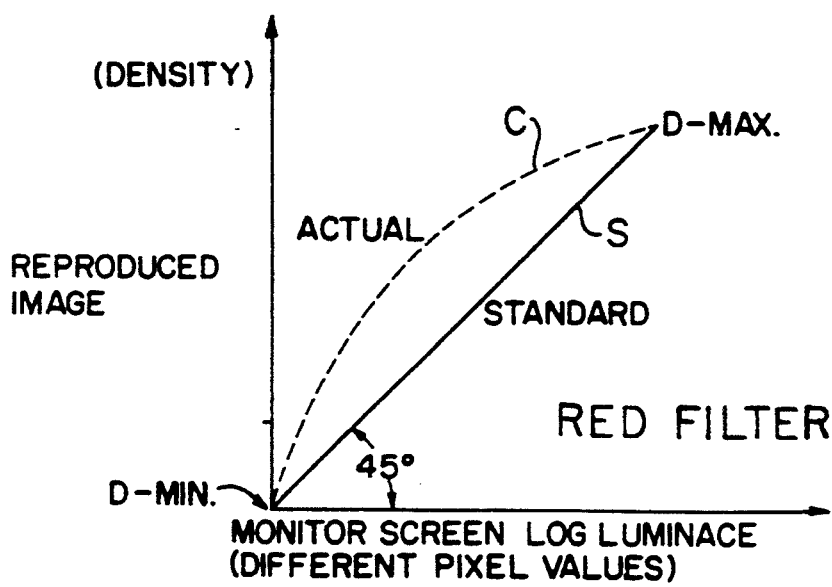

The corrections to be made for each color are illustrated in FIGS. 8A–8C. These are similar to the graph of FIG. 2. Each color is separately corrected and its correction is entered into the look-up table (LUT) 32A of the Video Processor 39A (FIG. 9). The total of the three colors will yield a fully corrected color so that the test pattern 37B' of the hard copy 36A (after such corrections) will match the gray tone and color of the tested gray patch of the test pattern 37A' of the color video monitor 20A. In FIGS. 8A–8C both the original (screen image) and reproduced hard copy image are measured with the same filters and detectors. When each of the curves of FIGS. 8A–8C are corrected, by changing the look-up table LUT 32A, the total color (and tone) will have been corrected on the hard copy.

I claim:

1. The method of producing a series of xerographic hard copy images which are accurate tone reproductions of the luminance ratios of an image on a video monitor without affecting the video monitor image, including the steps of:

forming a gray scale test video image on the screen of the video monitor, measuring the luminance of the gray scale of the test image on the monitor screen using a photometer to provide a set of monitor screen gray scale luminance values, and entering the set of monitor screen gray scale luminance values into a computer;

forming a gray scale test image on the hard copy using a xerographic hard copy printing system, said xerographic printing system including electronic means to vary the control signals to control the density values printed by said printing system on a dot-by-dot basis, the hard copy test image having a predetermined tone scale including defined areas differing in density;

xerographic printing said hard copy test image to produce a hard copy image using the same batches of materials as will be thereafter used by the printing system to print the images from the video monitor; density sensing the density differences in the gray scale on the hard copy test image using a photoelectric densitometer and entering the sensed density differences values into the computer, comparing said entered hard copy density differences values with the set of monitor gray scale luminance values stored in computer memory; using the computer to calculate and generate a set of corrections to said control signals for each density value for each dot printed by said printing system based on said comparison, and altering the tones printed by said printing system according to said set of computer produced corrections using the electronic means of said printing system.

2. The method of claim 1 wherein the hard copy test image, set of corrections and altering the setting of the electronic means is done on a daily basis when the series of hard copies is being produced.

3. The method of claim 1 and including the step of showing a video image on the monitor screen substantially simultaneously with printing said image on said hard copy.

4. The method of producing a series of hard copy images which are accurate tone reproductions of the luminance ratios of the video images on a video monitor screen without affecting the video monitor screen images, including the steps of:

forming a gray scale test video image on the screen of the video monitor, measuring the luminance in the gray scale of the test image on the monitor screen using a photometer to provide a set of monitor screen gray scale luminance values, and entering the set of monitor screen gray scale luminance values into a computer;

forming a gray scale test image on the hard copy using a hard copy printing system, said printing system including electronic means to vary the control signals to control the density values printed by said printing system on a dot-by-dot basis, the hard copy test image having a predetermined tone scale including defined areas differing in density;

printing said hard copy test image to produce a printed image of said hard copy test image using the same batch of hard copy reproduction materials as will be thereafter used by the printing system to print the images from the video monitor; density sensing the density differences in the gray scale on the hard copy test image using a photoelectric densitometer and entering the sensed density differences values into the computer, comparing said entered hard copy density differences values with the set of monitor gray scale luminance values stored in computer memory; using the computer to calculate and generate a set of corrections to said control signals for each density value for each dot printed by said printing system based on the said comparison, and altering the tones printed by said printing system according to said set of computer produced corrections using the electronic means of said printing system.

5. The method of claim 4 wherein the gray scale test image on the hard copy is produced by an ink jet printing system and an ink jet printing system is used to print the hard copy test image.

6. The method of claim 4 wherein the gray scale test image of the hard copy is produced by a laser beam, the hard copy is photographic film and the film is processed using a series of chemical solutions.

7. The method as in claim 4 wherein the hard copy test image, set of corrections and altering the setting of the electronic means is done on a daily basis when the series of hard copies is being produced.

8. The method as in claim 4 and including the step of showing a video image on the monitor screen substantially simultaneously with printing said image on said hard copy.

9. The method as in claim 4 wherein the printing of said test image includes the steps of exposing selected dots of a photosensitive material on a substrate to a latent image forming light beam, and crushing the substrate to transfer the exposed photosensitive material to a receiving sheet.

10. The method as in claim 9 wherein the hard copy is selected from the group of the substrate and the receiving sheet and the hard copy is not chemically processed after said crushing.

11. The method of claim 4 wherein the printing of said test image includes the step of forming a half tone image consisting of dots whose sizes differ to provide differences in density.

12. The method of claim 4 wherein the hard copy is produced by a photographic diffusion transfer process in which imaging agents are diffused from an exposed layer to a receiving layer.

13. The method of producing a series of color hard copy images which are accurate reproductions of the colors of video images on a video monitor screen without affecting the video monitor screen images, including the steps of:

forming a test video image on the screen of the video monitor, measuring the colors of the test image on the monitor screen using an electronic meter to provide a set of monitor screen color values, and entering the set of monitor screen values into a computer;

forming a test image on the hard copy using a hard copy printing system, said printing system including electronic means to vary the control signals to control the color intensity printed by said printing system on a dot-by-dot basis, the hard copy test image having predetermined colored areas including defined areas differing in color intensities;

printing said hard copy test image to produce a color printed image of said hard copy test image using the same batch of hard copy color reproduction materials as will be thereafter used by the printing system to print the images from the video monitor; sensing the color differences on the hard copy test image using a photoelectric densitometer and entering the sensed color differences values into the computer; comparing said entered hard copy color difference values with the set of monitor color values stored in computer memory; using the computer to calculate and generate a set of corrections to said control signals for each color value for each dot printed by said printing system based on the said comparison, and altering the colors printed by said printing system according to said set of computer produced corrections using the electronic means of said printing system.

14. The method of producing a series of color hard copy images which are accurate reproductions of the colors of video images on a color video monitor screen without affecting the video monitor screen images, including the steps of:

forming a gray scale test video image on the screen of the video monitor, measuring the luminance in the gray scale of the test image on the monitor screen using a set of color filters and a photoelectric densitometer to provide a set of monitor screen color values, and entering the set of monitor screen color values into a computer;

forming a gray scale test image on the hard copy using a hard copy printing system, said printing system including electronic means to vary the control signals to control the color values printed by said printing system on a dot-by-dot basis, the hard coy test image having a predetermined tone scale including defined areas differing in color values;

printing said hard copy test image to produce a printed image of said hard copy test image using the same batch of hard copy color reproduction materials as will be thereafter used by the printing system to print the images from the video monitor; sensing the color differences in the gray scale on the hard copy test image using a set of color filters and a photoelectric densitometer and entering the sensed color differences values into the computer, comparing said entered hard copy color differences values with the set of monitor gray scale luminance values stored in computer memory; using the computer to calculate and generate a set of corrections to said control signals for each density value for each dot printed by said printing system based on the said comparison, and altering the tones printed by said printing system according to said set of computer produced corrections using the electronic means of said printing system.

15. A system for producing a series of hard copies which are accurate tone reproductions of the color video images on a video monitor without affecting the video monitor images, including:

a color printing system means to print a color image having a plurality of colors on a dot-by-dot basis; means for forming a test image on said hard copy; the hard copy test image having predetermined color content; electronic means to vary the colors printed by said printing system on a dot-by-dot basis;

photoelectric densitometer means for sensing the color differences on the hard copy test image after it has been printed to produce a set of densitometer differences values;

a color video monitor having a monitor video screen, means for forming a color content video test pattern on the monitor screen;

electronic means for sensing the color intensities of the colors in the test pattern on the monitor screen and for providing a set of monitor screen color values;

computer means connected to said densitometer means, said computer means including means for entering the set of densitometer difference values and the set of monitor screen color values into said computer; memory means for storing the photometer means sensed values, calculation means for comparing said densitometer color values with the set of electronic means difference values stored in computer memory to produce a set of correction values and correction generating means for generating a correction value for the colors printed by said printing system, said generating means being connected to said electronic control means for altering the printing density on a dot-by-dot basis according to said correction values.

16. A system as in claim 15 wherein said printing system is a color xerographic system.

17. A system as in claim 16 wherein the xerographic system includes a photosensitive drum, a laser beam means to create a latent image on said drum and wherein said electronic control means controls said laser beam means.

18. A system as in claim 15 wherein said printing system includes means to modulate a laser beam to form a latent image on photographic film.

19. A system as in claim 15 and further including light means for illuminating and manipulating a light source to view the hard copy reproductions and adjustable means to match the luminance and color of the monitor screen image in order to obtain absolute luminance and color reproduction.

20. A system as in claim 15 wherein the electronic means includes a set of filters and an optic fiber cable and means to connect the fiber cable to the densitometer.

21. A system as in claim 15 wherein said memory means includes a look-up table.

22. A system as in claim 15 wherein said color printing system means includes diffusion transfer means for diffusing imaging agents from an exposing layer to a receiving layer to print said hard copy.

23. A system as in claim 22 wherein said diffusion transfer means includes means to chemically process said hard copy.

24. A system as in claim 22 wherein said diffusion transfer means includes means to process said hard copies without a liquid chemical process bath.

* * * * *